United States Patent
Tsukikawa

(10) Patent No.: US 12,450,800 B2
(45) Date of Patent: Oct. 21, 2025

(54) IMAGE PROCESSING APPARATUS AND IMAGE PROCESSING METHOD THAT DETERMINE TRANSMITTANCE OF AN IMAGE BASED ON DEFECT INFORMATION

(71) Applicant: CANON KABUSHIKI KAISHA, Tokyo (JP)

(72) Inventor: Takenori Tsukikawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 218 days.

(21) Appl. No.: 18/303,685

(22) Filed: Apr. 20, 2023

(65) Prior Publication Data
US 2023/0368449 A1 Nov. 16, 2023

(30) Foreign Application Priority Data
May 16, 2022 (JP) ................. 2022-080353

(51) Int. Cl.
*G06T 11/60* (2006.01)
*G01N 21/01* (2006.01)
(Continued)

(52) U.S. Cl.
CPC ............ *G06T 11/60* (2013.01); *G06T 7/0002* (2013.01); *G01N 21/01* (2013.01);
(Continued)

(58) Field of Classification Search
CPC ... G06T 11/60; G06T 7/0002; G06T 2200/24; G06T 2210/62; G01N 21/8851;
(Continued)

(56) References Cited

U.S. PATENT DOCUMENTS 8,654,333 B2 * 2/2014 Shigeta .............. G01N 21/8903
356/432
9,625,386 B2 * 4/2017 Hatanaka ........... G01N 21/6456
(Continued)

FOREIGN PATENT DOCUMENTS

| CN | 109584224 A | 4/2019 |
|---|---|---|
| JP | 6569002 B | 8/2019 |
| WO | 2017168737 A1 | 10/2017 |

OTHER PUBLICATIONS

Huthwohl, P. et al., "Multi-classifier for reinforced concrete bridge defects" May 9, 2019, Automation in Construction, vol. 105, pp. 1 to 15 (15 pages).
(Continued)

*Primary Examiner* — YuJang Tswei
(74) *Attorney, Agent, or Firm* — Venable LLP

(57) ABSTRACT

An image processing apparatus including a processor and a memory, having instructions stored thereon, which, when executed by the processor, cause the image processing apparatus to acquire a captured image of an inspection target, to detect defect information based on the image, to determine a transmittance of the image based on a trend in the defect information, to determine whether a first setting for displaying the defect information in a highlighted state is enabled, to generate a first layer including the image, if the first setting is enabled, a second layer to which a predetermined transmittance is set, and, if the first setting is disabled, a third layer including the defect information without generating the second layer, and to display the first, second, and third layers so as to be superimposed on one another, or to display the first and third layers so as to be superimposed on one another.

17 Claims, 14 Drawing Sheets

(51) Int. Cl.
  *G01N 21/88* (2006.01)
  *G06T 7/00* (2017.01)
(52) U.S. Cl.
  CPC .......... *G01N 2021/0112* (2013.01); *G01N 2021/0143* (2013.01); *G01N 21/8851* (2013.01); *G01N 2021/888* (2013.01); *G01N 2021/8887* (2013.01); *G06T 2200/24* (2013.01); *G06T 2210/62* (2013.01)
(58) Field of Classification Search
  CPC .......... G01N 21/01; G01N 2021/0112; G01N 2021/0143; G01N 2021/888; G01N 2021/8887
  See application file for complete search history.

(56) References Cited

U.S. PATENT DOCUMENTS

| | | | | |
|---|---|---|---|---|
| 2009/0304259 | A1* | 12/2009 | Yamamoto | H01L 22/20 382/145 |
| 2012/0141011 | A1* | 6/2012 | Sakai | G01N 21/9501 382/149 |
| 2013/0207965 | A1* | 8/2013 | Hori | G06T 7/33 345/419 |
| 2014/0307946 | A1* | 10/2014 | Nakahira | G06T 7/0004 382/149 |
| 2019/0137409 | A1* | 5/2019 | Nogami | G06T 1/0007 |
| 2019/0170659 | A1* | 6/2019 | Kaneko | G01N 23/18 |
| 2019/0237296 | A1 | 8/2019 | Otani et al. | |
| 2021/0072165 | A1* | 3/2021 | Kaneko | G01N 23/04 |
| 2023/0135343 | A1 | 5/2023 | Sugawara et al. | |

OTHER PUBLICATIONS

Hao, R. et al., "A steel surface defect inspection approach towards smart industrial monitoring" Sep. 20, 2020, Journal of Intelligent Manufacturing, vol. 32, No. 7, pp. 1833 to 1843 (11 pages).

Kim, B. et al., "Automated Multiple Concrete Damage Detection Using Instance Segmentation Deep Learning Model" Nov. 12, 2020, Applied Science, vol. 10, No. 22, pp. 1 to 17 (17 pages).

Extended European Search Report issued on Oct. 16, 2023, in corresponding European Patent Application No. 23165884.0 (20 pages).

* cited by examiner

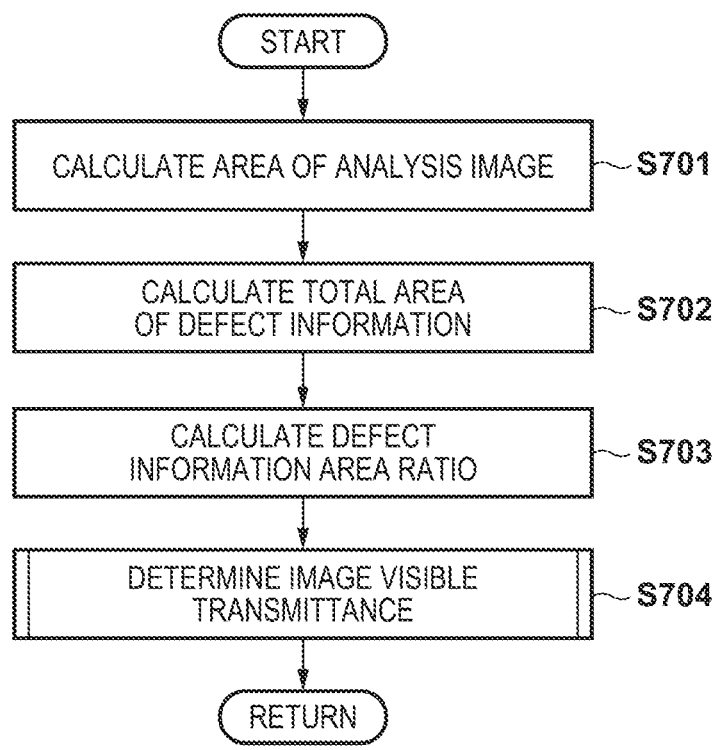

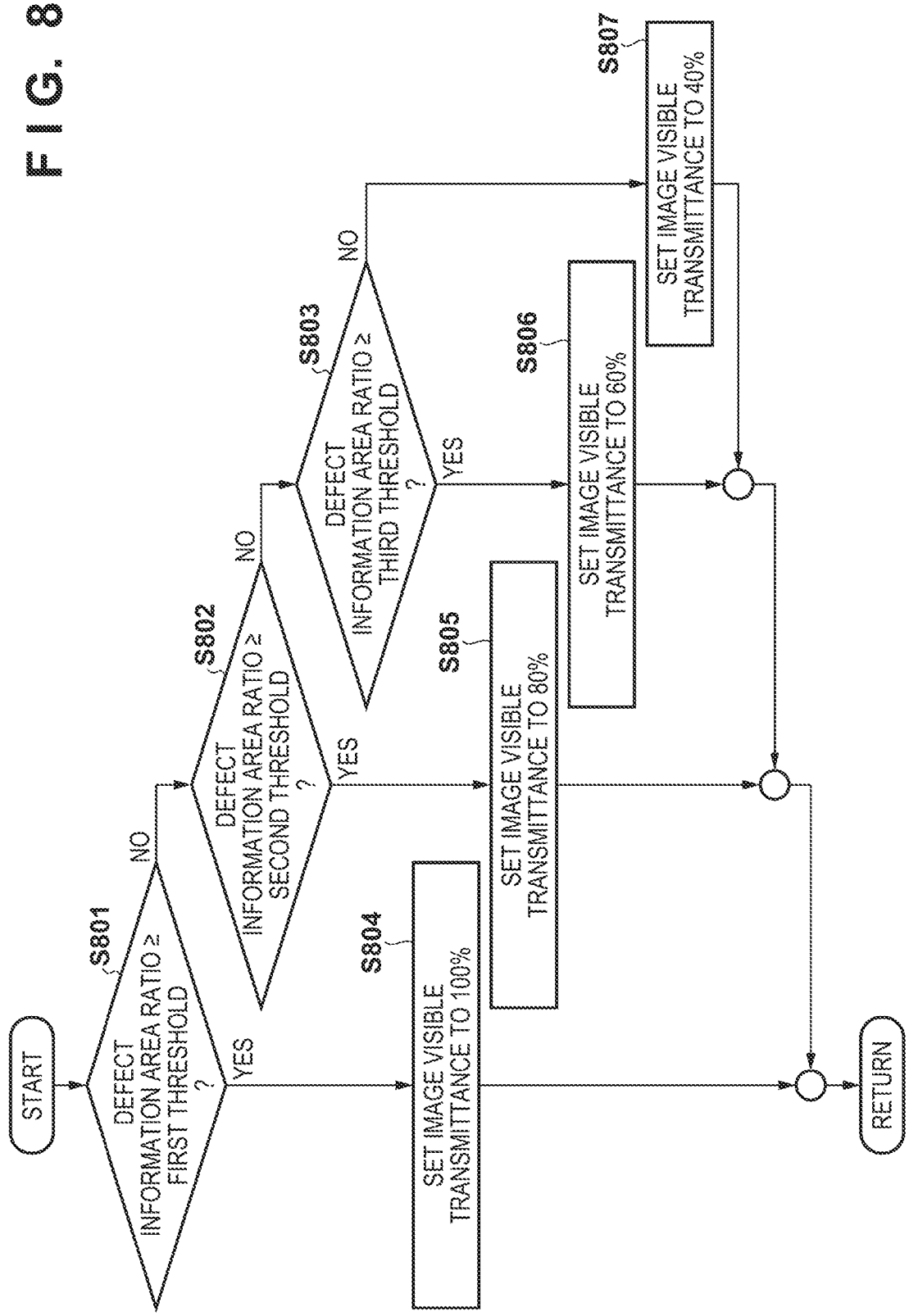

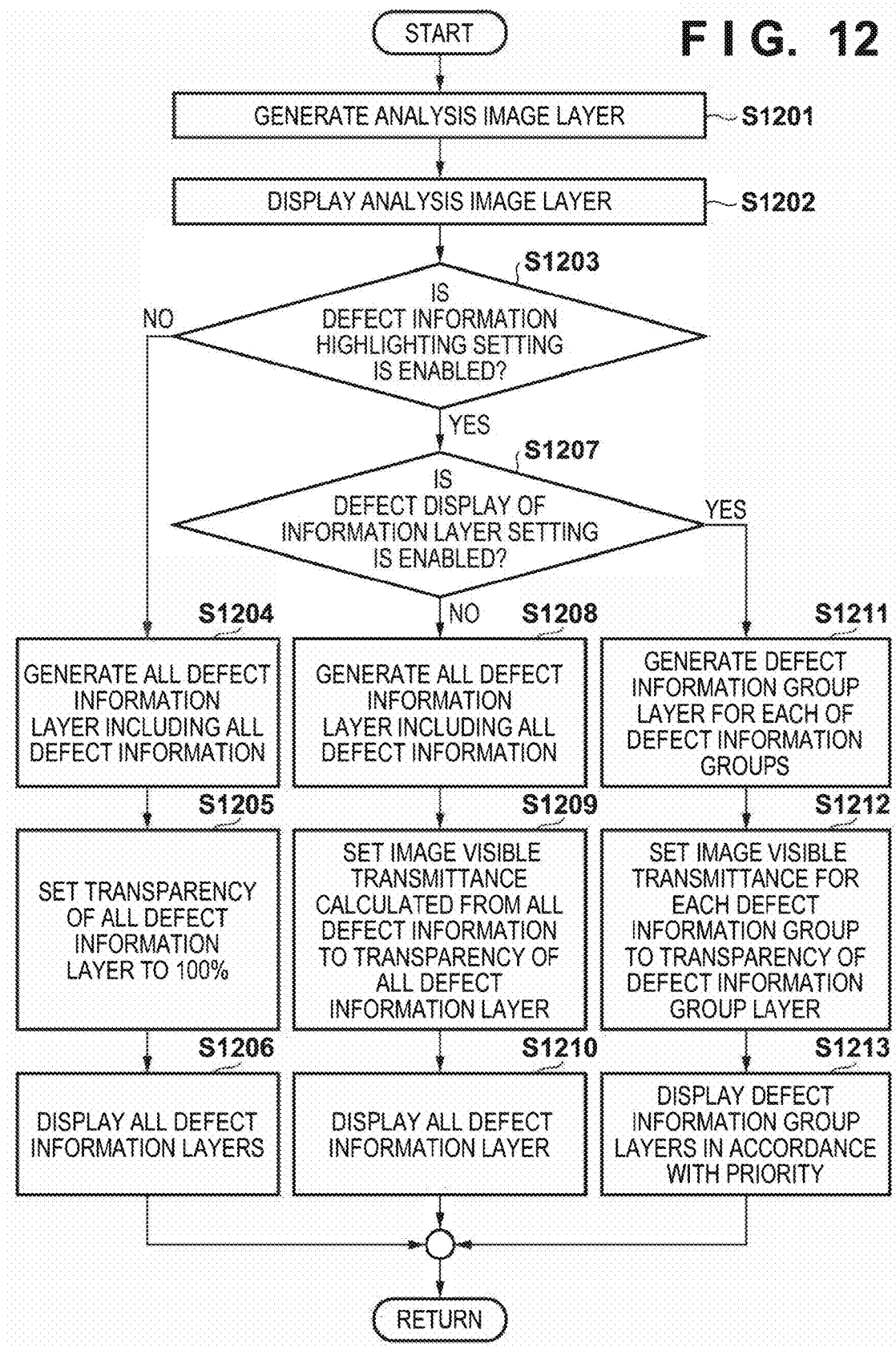

FIG. 14

| LAYER NAME | PRIORITY | LAYER CHARACTERISTIC | IMAGE VISIBLE TRANSMITTANCE (%) |
|---|---|---|---|
| DEFECT INFORMATION LAYER 1 | 1 | TYPE OF DEFECT IS CRACK, CRACK WIDTH IS MORE THAN 1.0 mm | 80 |
| DEFECT INFORMATION LAYER 2 | 2 | TYPE OF DEFECT IS CRACK, CRACK WIDTH IS 0.5 mm OR MORE AND LESS THAN 1.0 mm | 60 |
| DEFECT INFORMATION LAYER 3 | 3 | TYPE OF DEFECT IS CRACK, CRACK WIDTH IS LESS THAN 0.5 mm | 80 |
| ANALYSIS IMAGE LAYER | — | LAYER INCLUDING ANALYSIS IMAGE | 0 |

ANALYSIS IMAGE LAYER

DEFECT INFORMATION LAYER 1

DEFECT INFORMATION LAYER 2

DEFECT INFORMATION LAYER 3

IMAGE PROCESSING APPARATUS AND IMAGE PROCESSING METHOD THAT DETERMINE TRANSMITTANCE OF AN IMAGE BASED ON DEFECT INFORMATION

CROSS-REFERENCE TO PRIORITY APPLICATION

This application claims the benefit of Japanese Patent Application No. 2022-080353, filed May 16, 2022, which is hereby incorporated by reference herein in its entirety.

BACKGROUND OF THE INVENTION

Field of the Invention

The present invention relates to techniques for detecting defects from a captured image of an inspection target and displaying the detected defects.

Description of the Related Art

There is a method in which defects, such as cracks, are detected by a computer apparatus performing image analysis on a captured image of an inspection target such as a wall surface of a concrete structure. Defect information obtained as a result of image analysis is displayed to be checked by experts. Japanese Patent No. 6569002 discloses a method in which defect information obtained as a result of image analysis is displayed so as to be superimposed on the image subjected to image analysis.

However, because defect information is displayed so as to be simply superimposed on the image subjected to image analysis in Japanese Patent No. 6569002, the visibility of defect information decreases if a small defect is displayed so as to be superimposed on the image. Furthermore, the visibility of defect information also decreases if the color in which defect information is displayed and the color of the image region overlapping with the defect information are similar. A decrease in the visibility of defect information may lead to defect information being overlooked by experts and inspection of a structure being carried out insufficiently.

SUMMARY OF THE INVENTION

The present invention has been made in consideration of the aforementioned problems, and realizes techniques for improving the visibility of defect information obtained as a result of image analysis and displayed so as to be superimposed on the image subjected to image analysis as compared to that according to conventional techniques.

In order to solve the aforementioned problems, the present invention provides an image processing apparatus comprising an acquisition unit configured to acquire a captured image of an inspection target, a detection unit configured to detect one or more pieces of defect information based on the image acquired by the acquisition unit, and a control unit configured to display the pieces of defect information detected by the detection unit so as to be superimposed on the image displayed with a predetermined transmittance.

In order to solve the aforementioned problems, the present invention provides an image processing method comprising acquiring a captured image of an inspection target, detecting one or more pieces of defect information based on the acquired image; and displaying the detected pieces of defect information so as to be superimposed on the image displayed with a predetermined transmittance.

In order to solve the aforementioned problems, the present invention provides a non-transitory computer-readable storage medium storing a program that causes a computer to execute an image processing method comprising acquiring a captured image of an inspection target, detecting one or more pieces of defect information based on the acquired image, and displaying the detected pieces of defect information so as to be superimposed on the image displayed with a predetermined transmittance.

According to the present invention, the visibility of defect information obtained as a result of image analysis and displayed so as to be superimposed on the image subjected to image analysis can be improved as compared to that according to conventional techniques.

Further features of the present invention will become apparent from the following description of exemplary embodiments (with reference to the attached drawings).

BRIEF DESCRIPTION OF THE DRAWINGS

FIG. 7 is a flowchart illustrating processing for determining image visible transmittance from a defect trend in step S305 in FIG. 3.

FIG. 8 is a flowchart illustrating processing for determining image visible transmittance in step S704 in FIG. 7.

FIG. 12 is a flowchart illustrating processing for displaying a result of image analysis according to the second embodiment.

FIG. 14 is a diagram illustrating an example of a defect information layer list according to the second embodiment.

DESCRIPTION OF THE EMBODIMENTS

Figure 1:
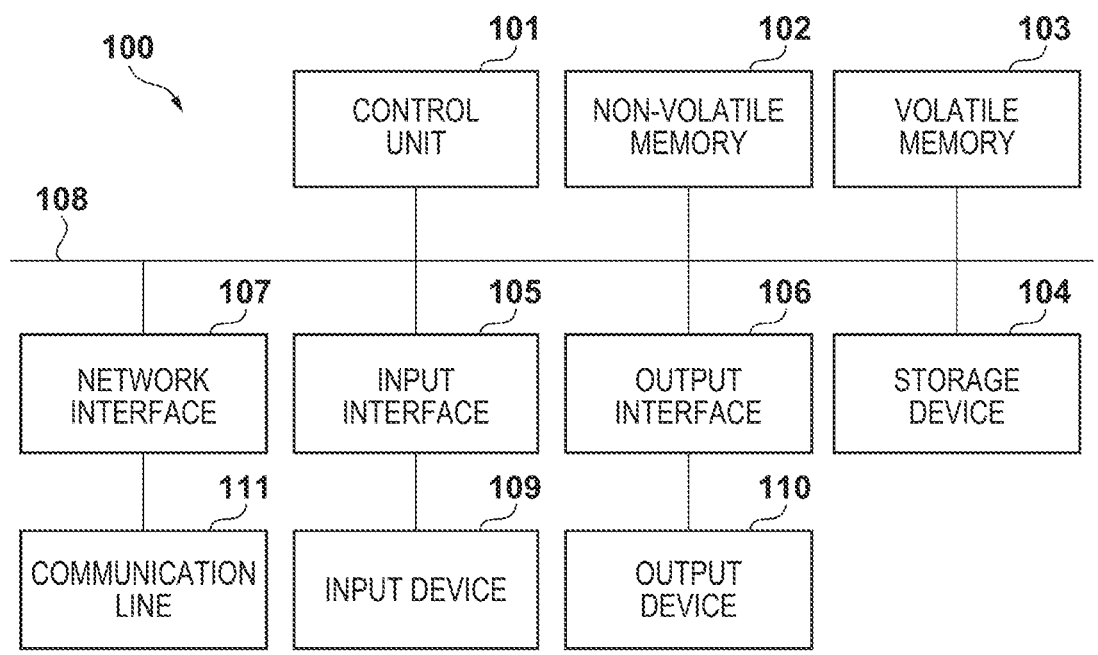
FIG. 1 is a block diagram illustrating a hardware configuration of an image processing apparatus according to a first embodiment.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and a redundant description thereof is omitted.

First Embodiment

In the following, embodiments will be described in which the image processing apparatus according to the present invention is applied to a computer apparatus used to inspect infrastructures such as concrete structures.

In the first embodiment, an example will be described in which the computer apparatus operates as the image processing apparatus and performs control such that pieces of defect information obtained by performing image analysis on an analysis image obtained by capturing an image of an inspection target are displayed so as to be superimposed on the analysis image displayed with a predetermined image visible transmittance.

Note that, in the present embodiment, an "inspection target" is an inspection-target concrete structure such as a motorway, a bridge, a tunnel, or a dam. Using an image of an inspection target captured by a user, the image processing apparatus performs defect detection processing for detecting the presence/absence and state of a defect such as a crack. Furthermore, in the case of concrete structures, for example, "defects" include cracking, cracking and flaking of concrete. Besides these, a "defect" includes efflorescence (crystalline deposit of salts), rebar exposure, rust, leakage, dripping, corrosion, damage (deficiency), cold joints, deposits, rock pocket, and the like.

<Hardware Configuration>

First, a hardware configuration of an image processing apparatus 100 according to the first embodiment will be described with reference to FIG. 1.

FIG. 1 is a block diagram illustrating a hardware configuration of a computer apparatus 100 serving as the image processing apparatus according to the first embodiment.

Note that the processing in the first embodiment described in the following and the second embodiment described later may be realized by using a single computer apparatus or by distributing functions among a plurality of computer apparatuses, as necessary. The plurality of computer apparatuses are connected so as to be capable of communicating with one another.

The computer apparatus 100 includes a control unit 101, a non-volatile memory 102, a work memory 103, a storage device 104, an input interface 105, an output interface 106, a network interface 107, and a system bus 108.

The control unit 101 includes an arithmetic processor, such as a CPU or an MPU, that integrally controls the entire computer apparatus 100. The non-volatile memory 102 is a ROM that stores parameters and a program executed by the processor of the control unit 101. Here, the program is a program for executing the later-described processing in the first and second embodiments. The work memory 103 is a RAM that temporarily stores data and programs supplied from external devices, etc. The storage device 104 is an internal device such as a hard disk or a memory card built into the computer apparatus 100, or an external device such as a hard disk or a memory card that is detachably connected to the computer apparatus 100. Examples of the storage device 104 include a memory card, a hard disk, or the like, constituted from a semiconductor memory, a magnetic disk, or the like. Examples of the storage device 104 also include a storage medium constituted from a disk drive that writes and reads data to and from an optical disk such as a CD, a DVD, or a Blu-ray® Disc.

The input interface 105 accepts user operations performed on an input device 109 such as a mouse, a keyboard, and/or a touch panel, and outputs operation instructions to the control unit 101. The output interface 106 displays data possessed by the computer apparatus 100 and data supplied from an external device to an output device 110, such as an LCD or an organic EL display or a monitor. The network interface 107 is communicably connected to a communication line 111, such as the Internet or a local area network (LAN). The system bus 108 connects the constituent elements 101 to 107 of the computer apparatus 100 so as to be capable of exchanging data with one another.

In the non-volatile memory 102 or the storage device 104, an operating system (OS) that is the basic software executed by the control unit 101 and applications that realize practical functions in cooperation with the OS are recorded. Furthermore, in the present embodiment, in the non-volatile memory 102 or the storage device 104, an application that realizes the later-described image analysis processing, in which the image processing apparatus 100 detects defects from a captured image of an inspection target, is stored.

The processing by the image processing apparatus 100 according to the present embodiment is realized by loading software provided by the application. Note that, the application includes software for using the basic functions of the OS installed in the image processing apparatus 100. Note that it may be the OS of the image processing apparatus 100 that includes software for realizing the processing in the present embodiment.

<Functional Configuration>

Next, functional blocks of the image processing apparatus 100 according to the first embodiment will be described with reference to FIG. 2.

Figure 2:
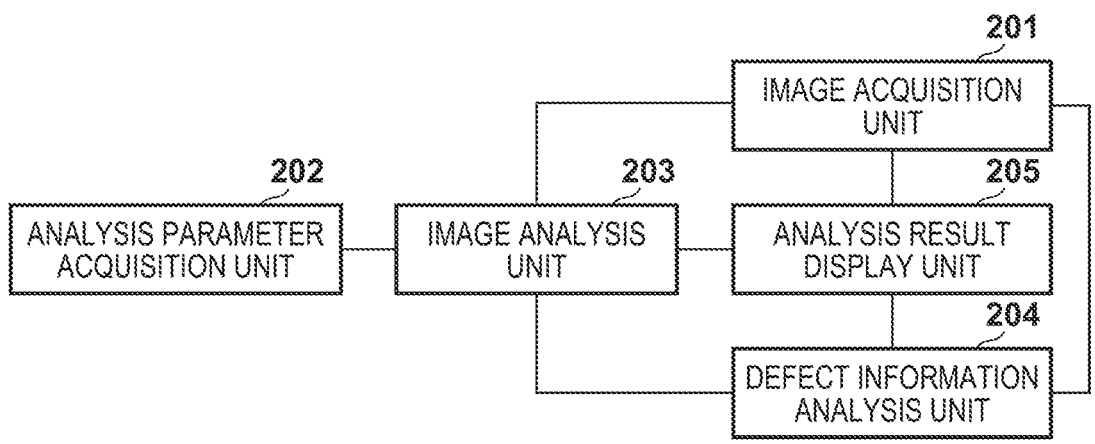
FIG. 2 is a functional block diagram of the image processing apparatus according to the first embodiment.

FIG. 2 is a functional block diagram of the image processing apparatus 100 according to the first embodiment.

The image processing apparatus 100 includes an image acquisition unit 201, an analysis parameter acquisition unit 202, an image analysis unit 203, a defect information analysis unit 204, and an analysis result display unit 205. Each function of the image processing apparatus 100 is constituted from hardware and software. Note that the image processing apparatus 100 may be configured as a system in which each functional unit is constituted from one or more computer and/or server devices, and such functional units are connected via a network.

Based on user-specified information, the image acquisition unit 201 acquires an analysis image that is a captured image of an inspection target.

The analysis parameter acquisition unit 202 acquires analysis parameters specified by a user operation in order to perform image analysis processing on the analysis image.

Using the analysis parameters acquired by the analysis parameter acquisition unit 202, the image analysis unit 203 executes image analysis processing on the analysis image acquired by the image acquisition unit 201.

The defect information analysis unit 204 analyzes a trend in pieces of defect information obtained by the image analysis unit 203 as a result of image analysis, and determines display conditions for displaying the pieces of defect information and the analysis image.

The analysis result display unit 205 performs control for displaying, based on the display conditions determined by the defect information analysis unit 204, the analysis image acquired by the image acquisition unit 201 and the pieces of defect information acquired by the image analysis unit 203 as a result of image analysis.

<Image Analysis Processing>

Figure 3:
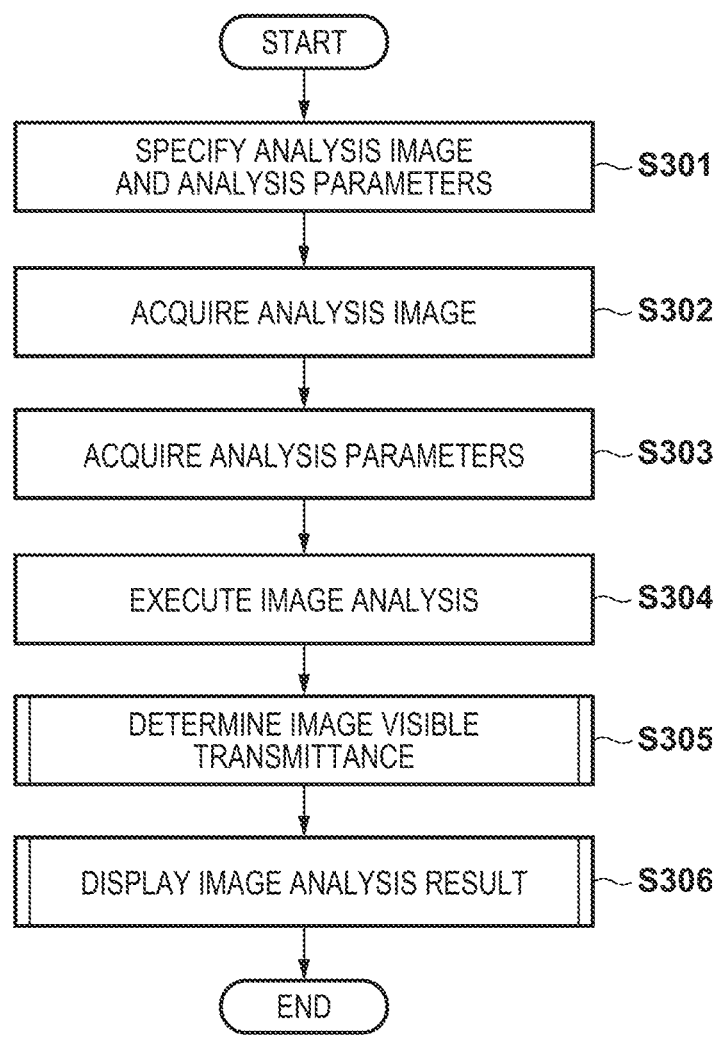
FIG. 3 is a flowchart illustrating image analysis processing according to the first embodiment.

FIG. 3 is a flowchart illustrating image analysis processing by the image processing apparatus according to the first embodiment.

Note that the processing in FIG. 3 is realized as a result of the control unit 101 of the image processing apparatus 100 illustrated in FIG. 1 controlling the constituent elements and executing the functions illustrated in FIG. 2 by decompressing the program stored in the non-volatile memory 102 on the work memory 103 and executing the program. This similarly applies to FIG. 7, FIG. 8, and FIGS. 10 to 12 described later.

In step S301, the control unit 101 accepts, via the input device 109, a user operation for specifying an analysis image from among a plurality of captured images of an inspection-target structure and a user operation for specifying analysis parameters.

In step S302, the image acquisition unit 201 reads the analysis image specified in step S301 from the storage device 104 or acquires the analysis image via the network interface 107.

In step S303, the analysis parameter acquisition unit 202 acquires the analysis parameters specified in step S301.

In step S304, using the analysis parameters acquired in step S303, the image analysis unit 203 executes image analysis processing on the analysis image acquired in step S302.

In step S305, the defect information analysis unit 204 analyzes a trend in one or more pieces of defect information obtained as a result of image analysis in step S304, and determines an image visible transmittance to be applied when the analysis image acquired in step S302 is displayed. The processing for determining the image visible transmittance will be described in detail later with reference to FIG. 7. Note that the image visible transmittance is a value indicating the visibility level of an analysis image through pieces of defect information in a state in which the pieces of defect information is displayed so as to be superimposed on the analysis image. For example, if a white image drawn using only white having the same width and height as a display image and having zero percent transparency is superimposed on the display image, only the white image would be visible and the display image would be completely invisible. The image visible transmittance would be zero percent in such a state. As another example of a case in which the image visible transmittance is zero percent, there also is a method of displaying the display image in a transparent state by making the display image itself 100% transparent. Furthermore, a case in which the image visible transmittance is thirty percent corresponds to when the white image is superimposed on the display image in a state in which the white image is made thirty percent transparent or when the display image is displayed in a state in which the display image is made 70% transparent.

In step S306, based on the image visible transmittance determined in step S305, the analysis result display unit 205 displays the analysis image acquired in step S302 and the pieces of defect information obtained as a result of image analysis in step S304 so as to be superimposed on one another.

Figure 4:
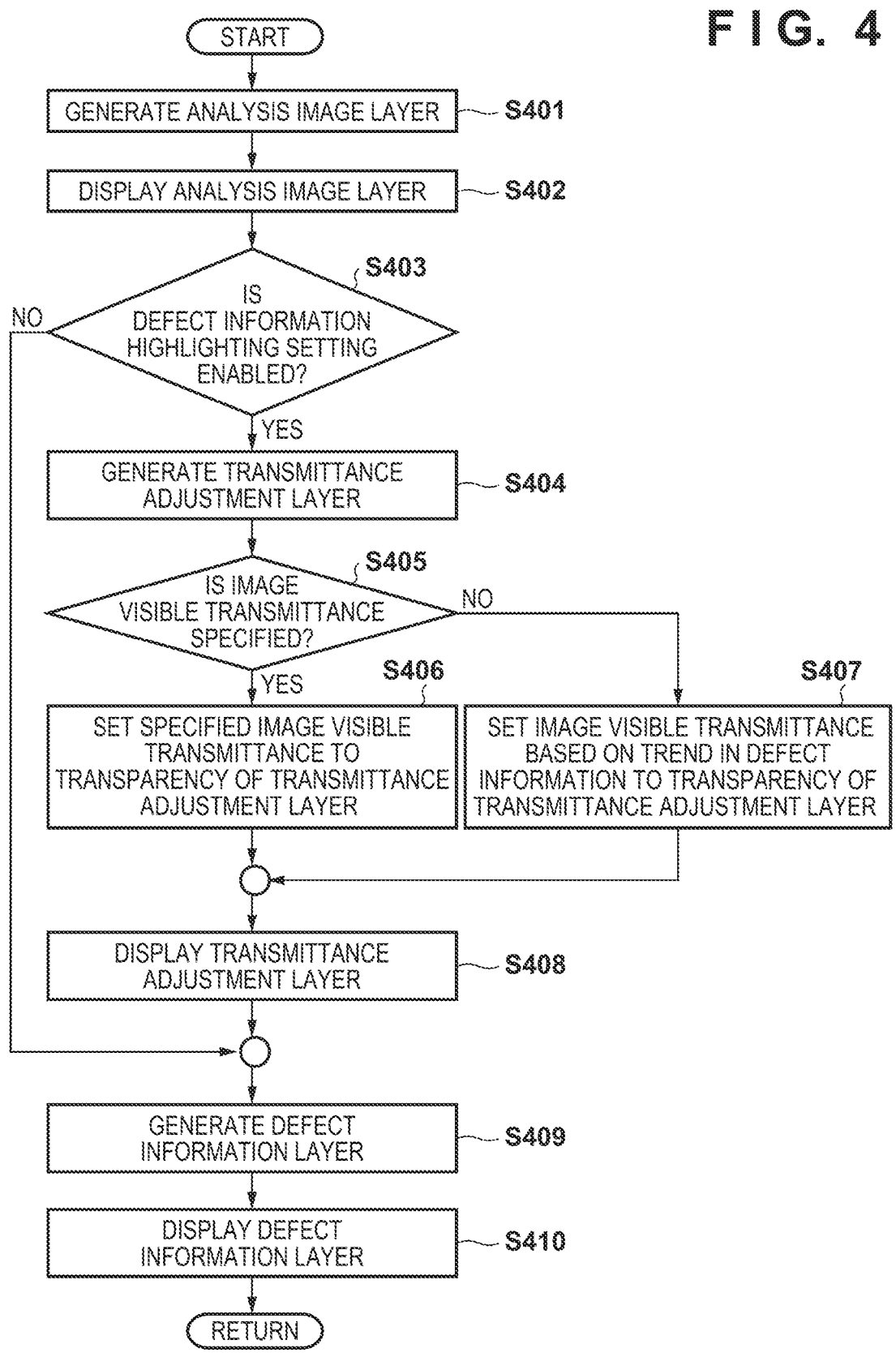
FIG. 4 is a flowchart illustrating processing for displaying a result of image analysis in step S306 in FIG. 3.

FIG. 4 is a flowchart illustrating the processing for displaying the result of image analysis in step S306 in FIG. 3.

Figure 5C:
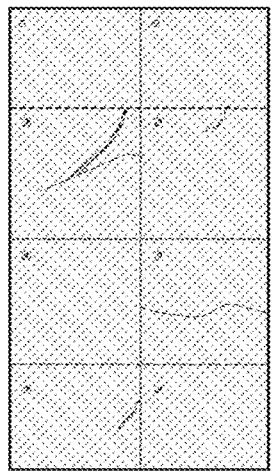
FIGS. 5A to 5E are diagrams illustrating an example of display of the result of image analysis according to the first embodiment.
Figure 5B:
Figure 5E:
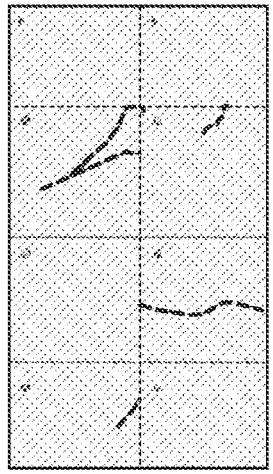
Figure 5D:
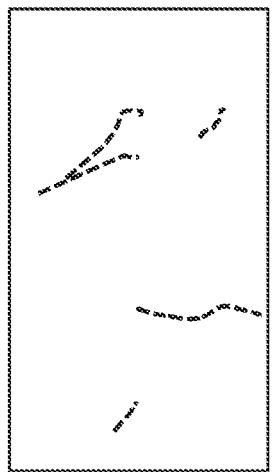
Figure 5A:

In step S401, in order to display the analysis image, the analysis result display unit 205 generates an analysis image layer including the analysis image. FIG. 5A illustrates an example of the analysis image layer. In the example in FIG. 5A, the analysis image is a captured image of a wall surface of an inspection-target concrete structure, and defects such as cracks are formed in the wall surface.

In step S402, the analysis result display unit 205 displays the analysis image layer generated in step S401.

Figure 6A:
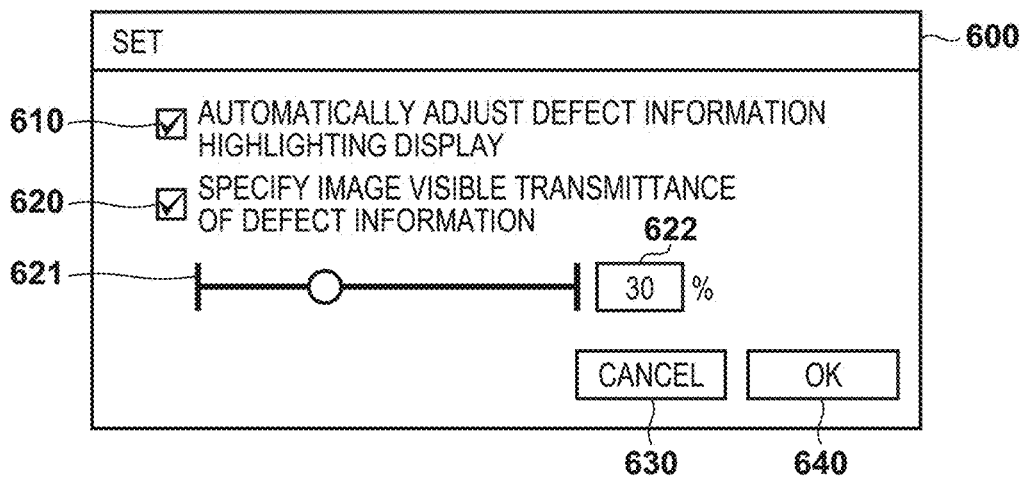
FIGS. 6A to 6C are diagrams illustrating an example of a graphical user interface (GUI) for setting a highlighting setting according to the first embodiment.
Figure 6B:
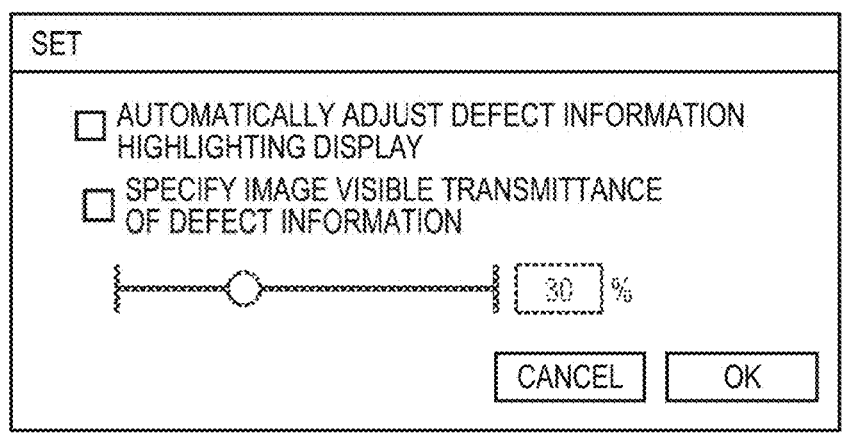
Figure 6C:
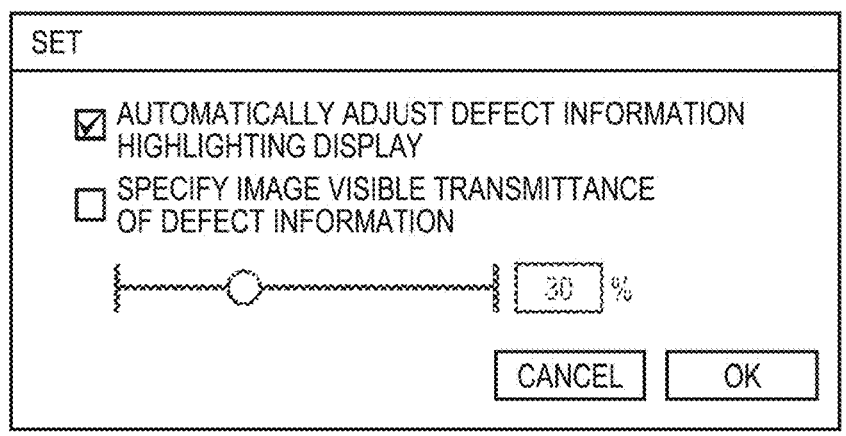

In step S403, the analysis result display unit 205 determines whether or not a defect information highlighting setting is enabled. Processing is advanced to step S404 if the result of the determination is that the highlighting setting is enabled, and processing is advanced to step S409 if the result of the determination is that the highlighting setting is disabled. Note that the highlighting setting is a setting for making the pieces of defect information readily visible when the pieces of defect information are displayed so as to be superimposed on the analysis image, and is set by the user using a graphical user interface (GUI) as illustrated in FIGS. 6A to 6C provided by the application according to the present embodiment. The highlighting setting processing will be described in detail later with reference to FIGS. 6A to 6C.

In step S404, the analysis result display unit 205 generates a transmittance adjustment layer for adjusting the transmission level of the analysis image. FIG. 5B illustrates an example of the transmittance adjustment layer. For example, the transmittance adjustment layer is a layer that has the same size as the analysis image layer and includes only the background color white, and is displayed so as to be superimposed on the analysis image layer. The transmittance of the analysis image can be adjusted by changing the transparency of the background color of the transmittance adjustment layer in such a manner.

In step S405, the analysis result display unit 205 determines whether or not an image visible transmittance has been specified by a user operation. Processing is advanced to step S406 if the result of the determination is that an image visible transmittance has been specified, and processing is advanced to step S407 if the result of the determination is that an image visible transmittance has not been specified. A method for specifying the image visible transmittance will be described later with reference to FIGS. 6A to 6C.

In step S406, the analysis result display unit 205 sets the image visible transmittance specified by a user operation as the transparency of the background color of the transmittance adjustment layer.

In step S407, the analysis result display unit 205 sets the image visible transmittance determined by the defect information analysis unit 204 as the transparency of the background color of the transmittance adjustment layer.

In step S408, the analysis result display unit 205 displays the transmittance adjustment layer so as to be superimposed on the analysis image layer. FIG. 5C illustrates an example of a state in which the transmittance adjustment layer is displayed over the analysis image layer. In the example in FIG. 5C, the image visible transmittance is reduced due to a semi-transparent filter being applied to the analysis image included in the analysis image layer as a result of the transmittance adjustment layer being displayed so as to be superimposed on the analysis image layer. Accordingly, by displaying the pieces of defect information so as to be further superimposed on the image illustrated in FIG. 5C, the visibility of the pieces of defect information is improved compared to when the pieces of defect information are simply superimposed on the analysis image.

In step S409, the analysis result display unit 205 generates a defect information layer including the pieces of defect information obtained by the image analysis unit 203 as a result of image analysis. FIG. 5D illustrates an example of the defect information layer. In the example in FIG. 5D, crack information is illustrated as the pieces of defect information. Furthermore, the background color is transparent. Note that, while crack information is illustrated using dotted lines in the example in FIG. 5D, the dotted lines are used for illustration in the drawings to elucidate the difference from the cracks included in the analysis image in FIG. 5A, and do not indicate that the cracks are intermittent.

In step S410, the analysis result display unit 205 displays the defect information layer generated in step S409 so as to be superimposed on the image illustrated in FIG. 5C. FIG. 5E illustrates a state in which the defect information layer is displayed so as to be superimposed on the image illustrated in FIG. 5C. In such a manner, the visibility of the pieces of defect information included in the defect information layer is improved as a result of the defect information layer being superimposed on the analysis image layer through the transmittance adjustment layer.

Next, the pieces of defect information highlighting setting method in step S403 in FIG. 4 will be described with reference to FIGS. 6A to 6C.

While an example will be described in the following of a method in which setting is performed using a GUI provided by the application according to the present embodiment, there is no limitation to this. For example, a file obtained by including description of setting information in a text file may be used. FIG. 6A illustrates an example of a defect information highlighting setting dialog 600.

The highlighting setting dialog 600 includes a defect information highlighting setting check box 610, an image visible transmittance specification check box 620, an image visible transmittance specification slider 621, an image visible transmittance specification text box 622, a cancel button 630, and an OK button 640. If a check is entered in the defect information highlighting setting check box 610, the highlighting setting is enabled. In contrast, if a check is not entered in the defect information highlighting setting check box 610, the highlighting setting is disabled. The user performs setting of the image visible transmittance specification check box 620 to specify an image visible transmittance. If a check is entered in the image visible transmittance specification check box 620, the image visible transmittance specified by the user is adopted, rather than the image visible transmittance being automatically adjusted. The user uses the image visible transmittance specification slider 621 or the image visible transmittance specification text box 622 to specify an image visible transmittance. The values of the image visible transmittance specification slider 621 and the image visible transmittance specification text box 622 are interlinked, and, when one is changed to another value, the other is also changed to the same value. The cancel button 630 is used to cancel processing without confirming any settings changed in the highlighting setting dialog 600. When the cancel button 630 is operated, the highlighting setting dialog 600 is closed without confirming any changes even if settings in the highlighting setting dialog 600 have been changed. The OK button 640 is used to confirm settings changed in the highlighting setting dialog 600. When the OK button 640 is operated, the settings after the change are confirmed if settings in the highlighting setting dialog 600 have been changed, and the highlighting setting dialog 600 is closed. Note that, if a check is not entered in the defect information highlighting setting check box 610, i.e., if the highlighting setting is disabled, the image visible transmittance cannot be specified. In the GUI in FIGS. 6A to 6C, the image visible transmittance specification check box 620, the image visible transmittance specification slider 621, and the image visible transmittance specification text box 622 are disabled as illustrated in FIG. 6B, for example. Furthermore, if a check is entered in the defect information highlighting setting check box 610, but a check is not entered in the image visible transmittance specification check box 620, the image visible transmittance specification slider 621 and the image visible transmittance specification text box 622 are disabled. FIG. 6C illustrates an example of the GUI in a case in which a check is not entered in the image visible transmittance specification check box 620.

Next, the processing in which the defect information analysis unit 204 analyzes a trend in the pieces of defect information and determines the image visible transmittance of the analysis image will be described with reference to FIG. 7.

FIG. 7 is a flowchart illustrating the processing for determining the image visible transmittance from a defect trend in step S305 in FIG. 3.

In step S701, the defect information analysis unit 204 calculates the area of the analysis image from the width and height of the analysis image acquired from the image acquisition unit 201.

In step S702, from the analysis result display unit 205, the defect information analysis unit 204 acquires display conditions to be used by the analysis result display unit 205 to display the pieces of defect information obtained as a result of image analysis by the image analysis unit 203. Furthermore, the defect information analysis unit 204 calculates the total area of the pieces of defect information when the pieces of defect information are rendered. For example, the display conditions to be used to display the pieces of defect information include the thickness in which cracks are to be displayed, whether or not regions where efflorescence has occurred are to be filled, etc.

In step S703, the defect information analysis unit 204 calculates a defect information area ratio indicating the ratio of the defect information rendering area calculated in step S702 to the analysis image area calculated in step S701. The defect information area ratio is indicated in percentage, and can be calculated by dividing the defect information rendering area by the analysis image area and multiplying the quotient by 100.

In step S704, the defect information analysis unit 204 calculates an image visible transmittance based on the defect information area ratio calculated in step S703. The processing for calculating the image visible transmittance will be described in detail with reference to FIG. 8. Note that, while an example has been described in which the ratio between the analysis image area and the defect information rendering area is used as the trend in the pieces of defect information, the trend in the pieces of defect information is not limited to this. For example, the number of the pieces of defect information, the types of the pieces defect information, the display positions of the pieces of defect information, the difference between the rendering color of the pieces of defect information and the color of the analysis image corresponding to the display position of the pieces of defect information, etc., may be used.

Next, the processing for determining the image visible transmittance in step S704 in FIG. 7 will be described with reference to FIG. 8.

In the following, an example of a case in which three thresholds have been set by the user will be described. Note that the three thresholds are related to one another as follows: a first threshold is greater than a second threshold, and the second threshold is greater than a third threshold (first threshold>second threshold>third threshold).

In step S801, the defect information analysis unit 204 determines whether or not the defect information area ratio calculated in step S703 is greater than or equal to the first threshold. Processing is advanced to step S804 if the result of the determination is that the defect information area ratio is greater than or equal to the first threshold, and processing is advanced to step S802 if the result of the determination is that the defect information area ratio is less than the first threshold. Here, the first threshold is set by the user using an automatic setting dialog 900 illustrated in FIG. 9.

Figure 9:
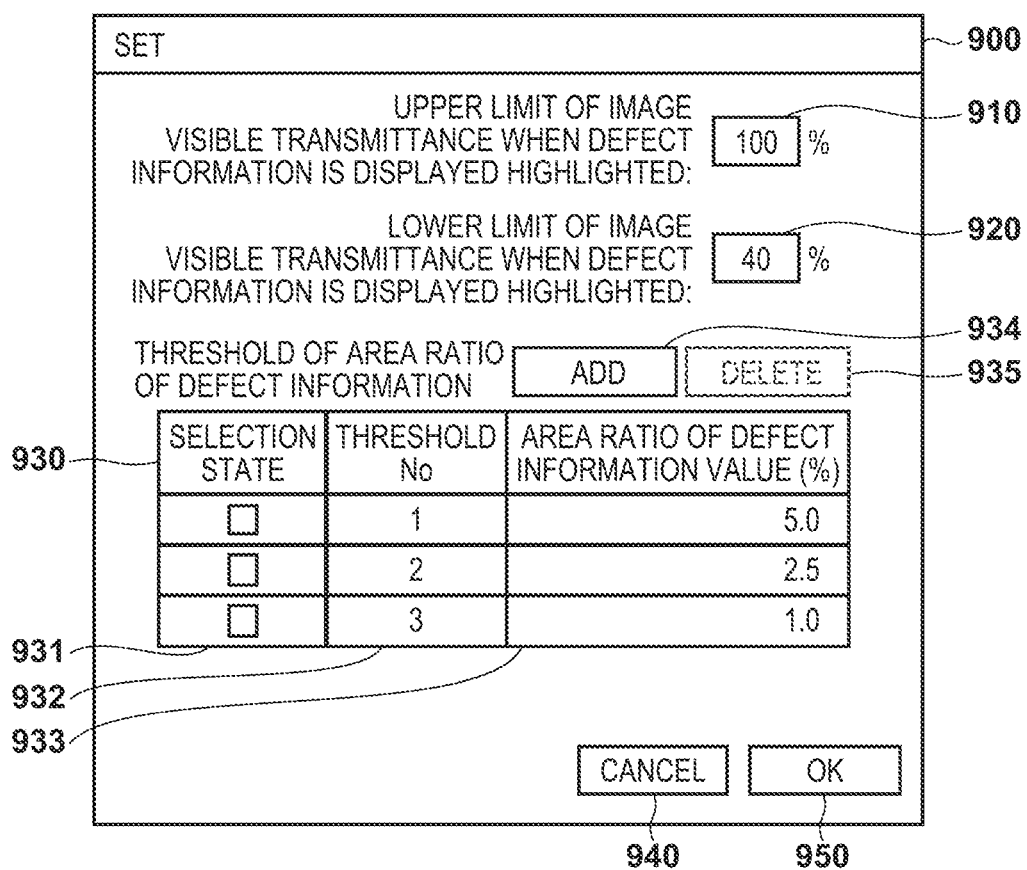
FIG. 9 is a diagram illustrating an example of a GUI for setting image visible transmittance according to the first embodiment.

The automatic setting dialog 900 illustrated in FIG. 9 includes a region for specifying the upper limit and the lower limit of the image visible transmittance when the defect information highlighting setting is enabled, a region for setting thresholds, a cancel button 940, and an OK button 950. The region for specifying the upper limit and the lower limit of the image visible transmittance includes an image visible transmittance upper limit text box 910 and an image visible transmittance lower limit text box 920.

The region for setting thresholds includes a threshold list 930, a threshold add button 934, and a threshold delete button 935. The threshold list 930 includes a selection state column 931 that indicates whether or not thresholds are selected by the user, a threshold number column 932 that indicates threshold numbers, and a defect information area ratio value column 933 that indicates defect information area ratios set as thresholds.

The value set in the image visible transmittance upper limit text box 910 and the value set in the image visible transmittance lower limit text box 920 serve as the upper limit and the lower limit of the image visible transmittance in a case in which the image visible transmittance is calculated by the defect information analysis unit 204. The upper limit of the image visible transmittance is an upper limit value when the image is displayed in the most transparency and the lower limit of the image visible transmittance is a lower limit value when the image is displayed in the lowest transparency.

In the threshold list 930, thresholds set by the user are displayed so as to be sorted in descending order based on the values in the defect information area ratio value column 933. If the user would like to add a threshold, the user operates the threshold add button 934. A new record is added to the threshold list 930 when the threshold add button 934 is operated. The user can set a threshold by inputting a value to the defect information area ratio value column 933 in the newly added record. In this case, the value for the threshold number column 932 will be automatically determined as a result of sorting being performed using the values in the defect information area ratio value column 933. Specifically, the record having the greatest value in the defect information area ratio value column 933 will always be the threshold indicated by threshold number one. Furthermore, the first threshold is the threshold indicated by threshold number one. Accordingly, the first threshold has the greatest defect information area ratio value among the thresholds.

Furthermore, if the user would like to delete existing thresholds, the user operates the threshold delete button 935 in a state in which checks are entered to check boxes in the selection state column 931 in the corresponding records.

If threshold settings have been changed using the threshold add button 934 and the threshold delete button 935, the OK button 950 and the cancel button 940 are operated to confirm the settings and discard the settings, respectively.

In the following, description will be provided of a case in which three thresholds have been set by the user.

In step S802, the defect information analysis unit 204 determines whether or not the defect information area ratio calculated in step S703 is greater than or equal to the second threshold. Processing is advanced to step S805 if the result of the determination is that the defect information area ratio is greater than or equal to the second threshold, and processing is advanced to step S803 if the result of the determination is that the defect information area ratio is less than the second threshold.

In step S803, the defect information analysis unit 204 determines whether or not the defect information area ratio calculated in step S703 is greater than or equal to the third threshold. Processing is advanced to step S806 if the result of the determination is that the defect information area ratio is greater than or equal to the third threshold, and processing is advanced to step S807 if the result of the determination is that the defect information area ratio is smaller than the third threshold.

In step S804, the defect information analysis unit 204 sets the image visible transmittance to the same value as the upper limit value set in the image visible transmittance upper limit text box 910. Because one hundred percent is specified in the example in FIG. 9, the image visible transmittance is set to one hundred percent.

In step S805, the defect information analysis unit 204 calculates, as an adjustment value, a value obtained by subtracting the lower limit value set in the image visible transmittance lower limit text box 920 from the upper limit value set in the image visible transmittance upper limit text box 910, and dividing the difference by the total number of thresholds. Then, the defect information analysis unit 204 determines a subtraction count indicating the number of times the adjustment value is to be subtracted from the upper limit value. The subtraction count is a number obtained by subtracting 1 from the threshold number of the threshold used in the determination in step S802. Finally, the defect information analysis unit 204 sets, as the image visible transmittance, a value obtained by subtracting the adjustment value from the upper limit value a number of times corresponding to the subtraction count. In the example in FIG. 9, because the upper limit value is one hundred percent, the lower limit value is forty percent, and the total number of thresholds is three, the difference between the upper limit value and the lower limit value, which is sixty percent, is divided by three, and the adjustment value is calculated as twenty percent. Furthermore, because the threshold number of the threshold used in the determination in step S802 is two, the subtraction count is calculated as one by subtracting one from two. Thus, eighty percent, which is obtained as a result of subtracting the twenty percent adjustment value from the one hundred percent upper limit value once, is set as the image visible transmittance.

In step S806, the defect information analysis unit 204 calculates an adjustment value in a similar manner as in step S805, and calculates the image visible transmittance based on the threshold number of the threshold used in the determination in step S803. In the example in FIG. 9, the adjustment value is calculated as twenty percent, which is the same as that calculated in step S805, and, because the threshold number of the threshold used in the determination in step S803 is three, the subtraction count is calculated as two by subtracting one from three. Thus, sixty percent, which is obtained as a result of subtracting the twenty percent adjustment value from the one hundred percent upper limit value twice, is set as the image visible transmittance.

In step S807, the defect information analysis unit 204 sets the image visible transmittance to the same value as the lower limit value set in the image visible transmittance lower limit text box 920.

According to the first embodiment, upon displaying pieces of defect information so as to be superimposed on an analysis image, the visibility of the pieces of defect information can be relatively improved by setting the image visible transmittance of the analysis image in the background of the pieces of defect information so as to be lower than one hundred percent, as described above. Furthermore, by changing the value of the image visible transmittance of the analysis image in accordance with a trend in pieces of defect information obtained as a result of image analysis, the image visible transmittance can be set lower in situations in which the user is more likely to overlook the pieces of defect information. Thus, the possibility of defect information being overlooked by experts and the possibility of inspection of a structure being carried out insufficiently can be reduced.

Second Embodiment

An image processing apparatus according to the second embodiment has a hardware structure similar to that in FIG. 1, and has a functional configuration differing in terms of the functions of the defect information analysis unit 204 and the analysis result display unit 205 in the configuration in FIG. 2.

First, the processing in which the defect information analysis unit 204 analyzes the trend in the pieces of defect information and determines the image visible transmittance will be described with reference to FIG. 10.

Figure 10:
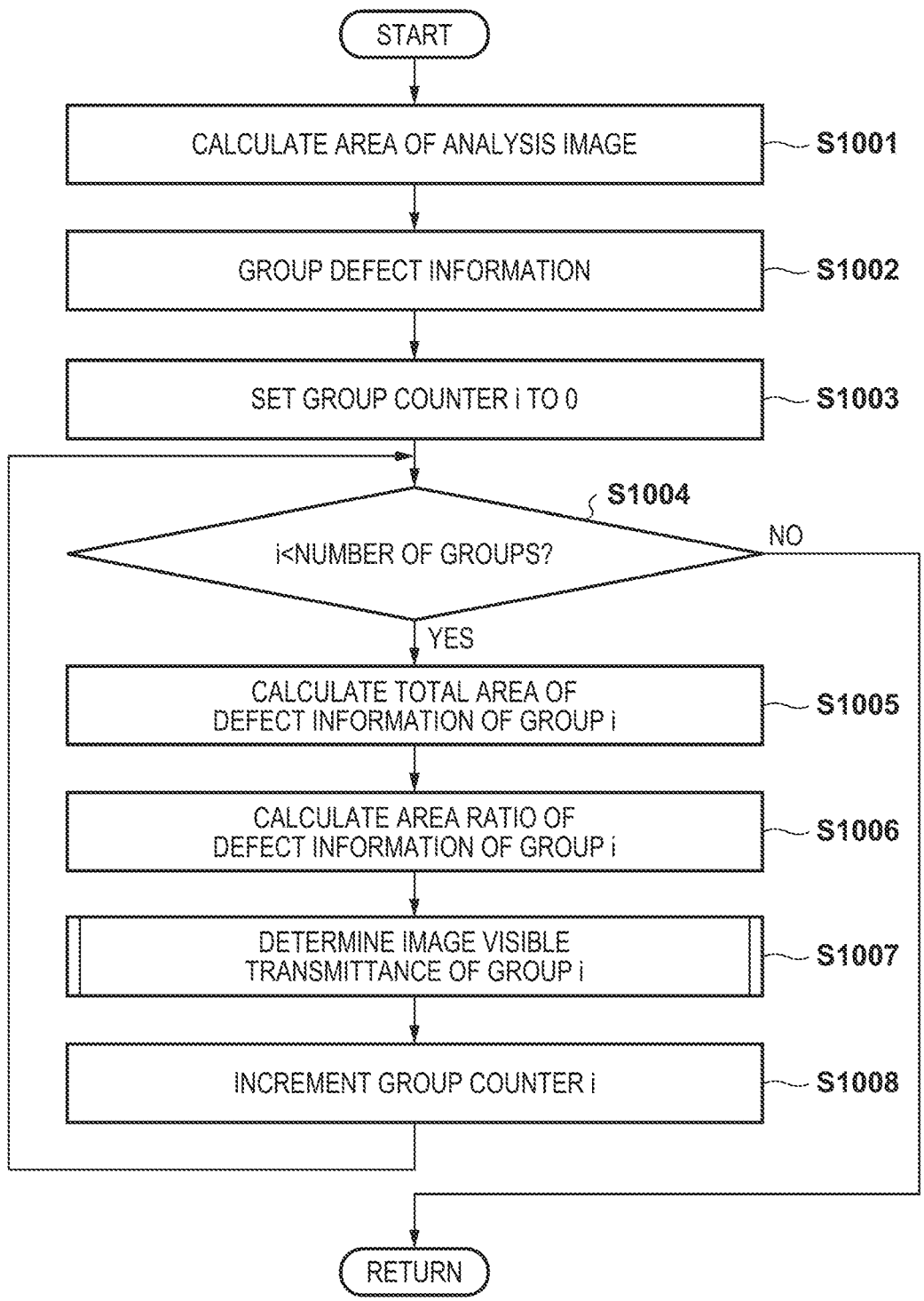
FIG. 10 is a flowchart illustrating processing for determining image visible transmittance from a defect trend according to a second embodiment.

FIG. 10 is a flowchart illustrating the processing for determining the image visible transmittance from a defect trend in step S305 in FIG. 3.

In step S1001, the defect information analysis unit 204 calculates the area of the analysis image from the width and height of the analysis image acquired from the image acquisition unit 201.

In step S1002, the defect information analysis unit 204 groups the pieces of defect information obtained as a result of image analysis by the image analysis unit 203 into groups in accordance with the characteristics of the defect information items. Note that, for example, the characteristics of the pieces of defect information are the types of the pieces of defect information, such as cracks and efflorescence, the areas of the pieces of defect information, the coordinates where the pieces of defect information are to be displayed, or the like. Also, characteristics corresponding to specific types of defect information may also be used. For example, if the pieces of defect information include cracks, the widths, lengths, shapes, etc., of the cracks may be used as the characteristics. Furthermore, if the image analysis processing has been executed multiple times while changing analysis parameters, the analysis parameters may be used as the characteristics of the pieces of defect information.

In step S1003, the defect information analysis unit 204 sets, to zero, a group counter i for counting the groups generated in step S1002.

In step S1004, the defect information analysis unit 204 determines whether or not the value of the group counter i is less than the number of groups into which grouping is performed in step S1002. Processing is advanced to step S1005 if the result of the determination is that the group counter i is less than the number of groups, and processing is terminated if the result of the determination is that the group counter i is more than or equal to the number of groups.

In step S1005, from the analysis result display unit 205, the defect information analysis unit 204 acquires the display conditions to be used by the analysis result display unit 205 to display the pieces of defect information included in a group i, where the group i indicates the ith group, among the groups into which grouping is performed in step S1002, i being the group counter value. Furthermore, the defect information analysis unit 204 calculates the total area of the pieces of defect information when the pieces of defect information are rendered. For example, the display conditions to be used to display the pieces of defect information include the thickness in which cracks are to be displayed, whether or not regions where efflorescence has occurred are to be filled, etc.

In step S1006, the defect information analysis unit 204 calculates a defect information area ratio indicating the ratio of the area of the pieces of defect information included in the group i calculated in step S1005 to the analysis image area calculated in step S1001. The defect information area ratio is indicated in percentage, and can be calculated by dividing the defect information rendering area by the analysis image area and multiplying the quotient by one hundred.

In step S1007, the defect information analysis unit 204 calculates an image visible transmittance of the group i based on the area ratio of the group i calculated in step S1006. The processing for calculating an image visible transmittance of a single group will be described in detail later with reference to FIG. 11. Note that, while an example has been described in which the ratio of the defect information rendering area to the analysis image area is used as a trend in pieces of defect information, the trend in the pieces of defect information is not limited to this. For example, the number of the pieces of defect information, the types of the pieces of defect information, the display positions of the pieces of defect information, the difference between the rendering color of pieces of defect information and the color of the analysis image corresponding to the display position of the pieces of defect information, etc., may be used.

In step S1008, the defect information analysis unit 204 increments the group counter i by one, and processing advances to step S1004.

Next, the processing for determining the image visible transmittance of each defect information group in step S1007 in FIG. 10 will be described with reference to FIG. 11.

Figure 11:
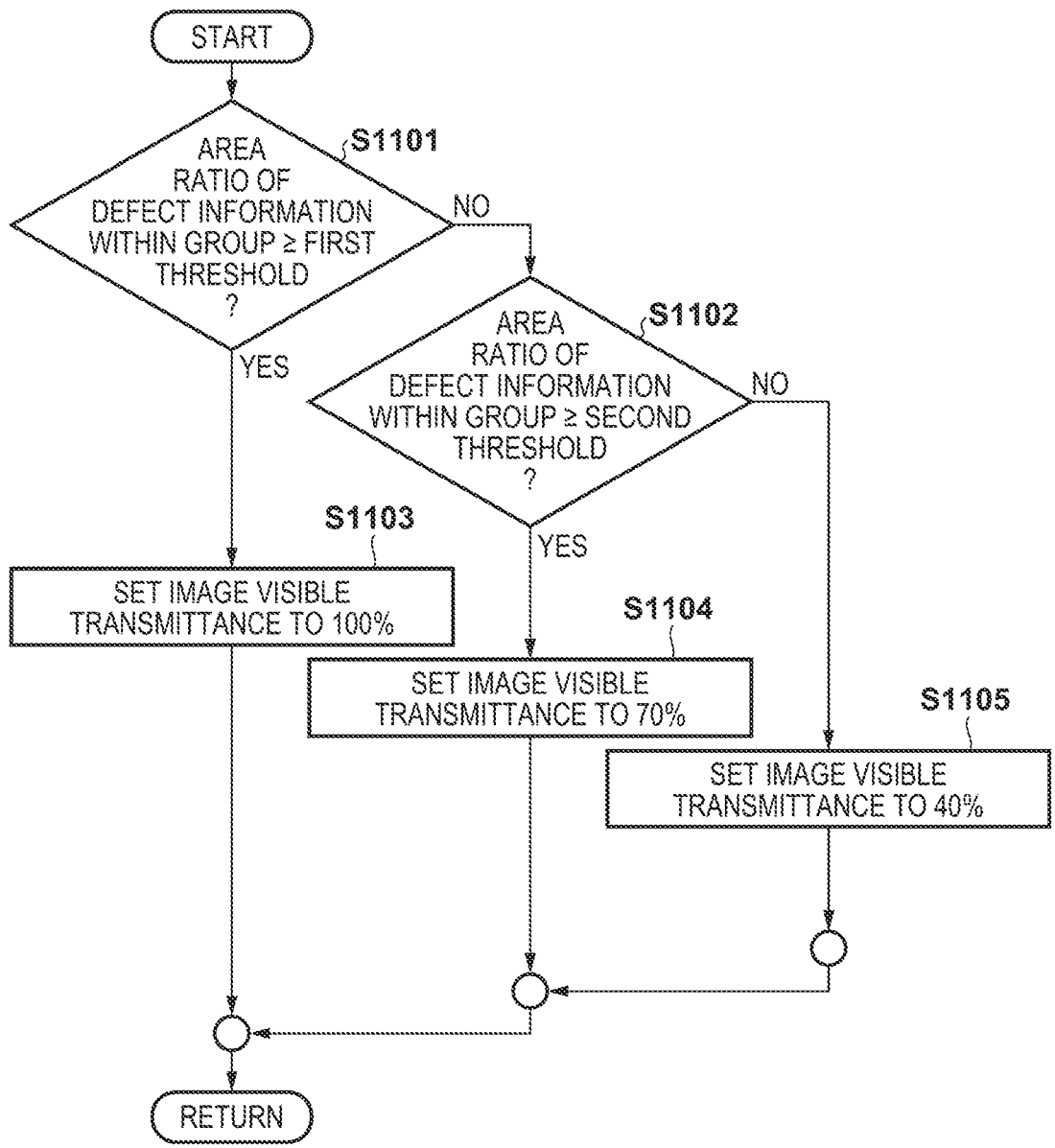
FIG. 11 is a flowchart illustrating processing for determining image visible transmittance in step S1007 in FIG. 10.

While processing for one defect information group will be described with reference to FIG. 11, the processing in FIG. 11 is to be repeated a number of times corresponding to the number of defect information groups if there are a plurality of defect information groups. Furthermore, a description will be provided in the following of a case in which two thresholds have been set by the user. Note that the two thresholds are related to one another as follows: a first threshold is greater than a second threshold (first threshold>second threshold).

In step S1101, the defect information analysis unit 204 determines whether or not the defect information area ratio of a defect information group calculated in step S1006 is greater than or equal to the first threshold. Processing is advanced to step S1103 if the result of the determination is that the defect information area ratio is greater than or equal to the first threshold, and processing is advanced to step S1102 if the result of the determination is that the defect information area ratio is smaller than the first threshold. Here, the first threshold is set by the user using the automatic setting dialog 900 illustrated in FIG. 9.

In step S1102, the defect information analysis unit 204 determines whether or not the defect information area ratio of the defect information group calculated in step S1006 is greater than or equal to the second threshold. Processing is advanced to step S1104 if the result of the determination is that the defect information area ratio is greater than or equal to the second threshold, and processing is advanced to step S1105 if the result of the determination is that the defect information area ratio is smaller than the second threshold.

In step S1103, the defect information analysis unit 204 sets the image visible transmittance of the defect information group to the same value as the upper limit value set in the image visible transmittance upper limit text box 910. Because one hundred percent is specified in the example in FIG. 9, the image visible transmittance of the defect information group is set to one hundred percent. When the image visible transmittance is one hundred percent, the analysis image is displayed so as to be completely visible through the pieces of defect information when the pieces of defect information are displayed so as to be superimposed on the analysis image. This is equivalent to a case in which the pieces of defect information are displayed so as to be simply superimposed on the analysis image.

In step S1104, the defect information analysis unit 204 calculates, as an adjustment value, a value obtained by subtracting the lower limit value set in the image visible transmittance lower limit text box 920 from the upper limit value set in the image visible transmittance upper limit text box 910, and dividing the difference by the total number of thresholds. Then, the defect information analysis unit 204 determines a subtraction count indicating the number of times the adjustment value is to be subtracted from the upper limit value. The subtraction count is a number obtained by subtracting one from the threshold number of the threshold used in the determination in step S1102. Finally, the defect information analysis unit 204 sets the image visible transmittance by subtracting the adjustment value from the upper limit value a number of times corresponding to the subtraction count. In the example in FIG. 9, because the upper limit value is one hundred percent, the lower limit value is forty percent, and the total number of thresholds is two, the difference between the upper limit value and the lower limit value, which is sixty percent, is divided by two, and the adjustment value is calculated as thirty percent. Furthermore, because the threshold number of the threshold used in the determination in step S1102 is two, the subtraction count is calculated as one by subtracting 1 from 2. Thus, seventy percent, which is obtained as a result of subtracting the thirty percent adjustment value from the one hundred percent upper limit value once, is set as the image visible transmittance of the defect information group.

In step S1105, the defect information analysis unit 204 sets the image visible transmittance of the defect information group to the same value as the lower limit value set in the image visible transmittance lower limit text box 920.

Next, the processing for displaying the analysis image and the pieces of defect information obtained as a result of image analysis so as to be superimposed on one another will be described with reference to FIG. 12.

In step S1201, in order to display the analysis image, the analysis result display unit 205 generates an analysis image layer including the analysis image.

In step S1202, the analysis result display unit 205 displays the analysis image layer generated in step S1201.

Figure 13A:
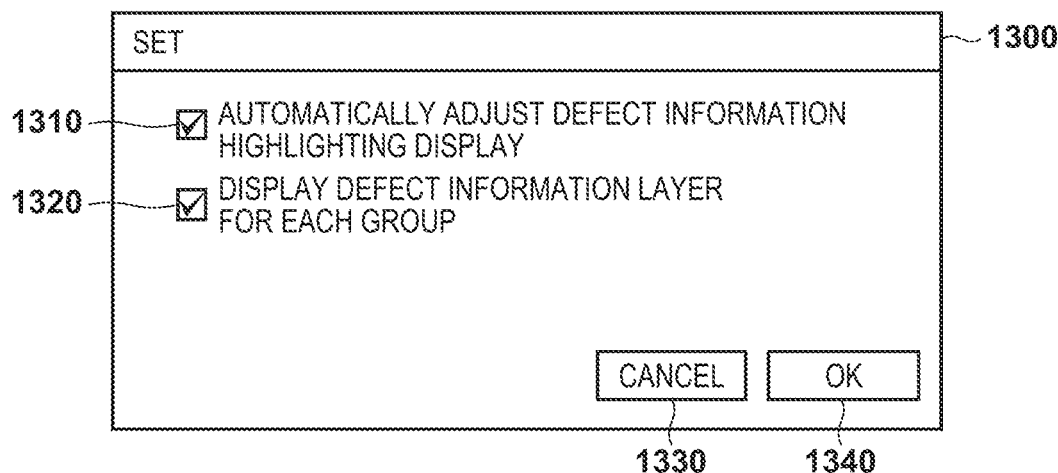
FIGS. 13A and 13B are diagrams illustrating an example of a GUI for setting a layer display setting according to the second embodiment.
Figure 13B:
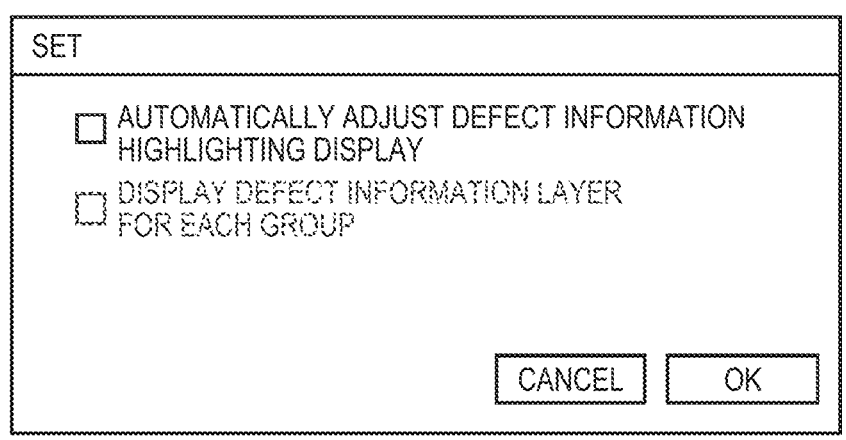

In step S1203, the analysis result display unit 205 determines whether or not the defect information highlighting setting is enabled. Processing is advanced to step S1207 if the result of the determination is that the highlighting setting is enabled, and processing is advanced to step S1204 if the result of the determination is that the highlighting setting is disabled. Note that the highlighting setting is set by the user using a GUI as illustrated in FIGS. 13A and 13B provided by the application according to the present embodiment, for example. The highlighting setting processing will be described in detail later with reference to FIGS. 13A and 13B.

In step S1204, the analysis result display unit 205 generates an all defect information layer including all pieces of defect information obtained as a result of image analysis by the image analysis unit 203.

In step S1205, the analysis result display unit 205 sets the transparency of the background color of the all defect information layer generated in step S1204 to one hundred percent. Consequently, the background color of the all defect information layer becomes transparent.

In step S1206, the analysis result display unit 205 displays the all defect information layer generated in step S1204 and configured in step S1205 so as to be superimposed on the analysis image layer. In this case, because the transparency of the background color of the all defect information layer is one hundred percent, the pieces of defect information are displayed so as to be simply superimposed on the analysis image, and a display is performed in a state in which the pieces of defect information are not highlighted.

In step S1207, the analysis result display unit 205 determines whether or not a defect information layer display setting is enabled. Processing is advanced to step S1211 if the result of the determination is that the defect information layer display setting is enabled, and processing is advanced to step S1208 if the result of the determination is that the defect information layer display setting is disabled. Note that the defect information layer display setting is set by the user using the GUI as illustrated in FIGS. 13A and 13B, for example. The defect information layer display setting method will be described in detail later with reference to FIGS. 13A and 13B.

In step S1208, the analysis result display unit 205 generates an all defect information layer including all pieces of defect information obtained as a result of image analysis by the image analysis unit 203.

In step S1209, the analysis result display unit 205 sets, as the transparency of the background color of the all defect information layer, an image visible transmittance calculated using all pieces of defect information as described with reference to FIG. 7, rather than grouping the pieces of defect information into groups as described with reference to FIG. 10.

In step S1210, the analysis result display unit 205 displays the all defect information layer generated in step S1208 and configured in step S1209 so as to be superimposed on the analysis image layer. Thus, because the analysis image is displayed so as to have an image visible transmittance determined in accordance with a trend in all pieces of defect information without grouping the pieces of defect information into groups, the pieces of defect information are displayed so as to be relatively highlighted as described in the first embodiment, and the possibility of defect information being overlooked by experts and the possibility of inspection of a structure being carried out insufficiently can be reduced.

In step S1211, the analysis result display unit 205 generates a defect information group layer for each of the defect information groups described in FIG. 10.

In step S1212, as the transparency of the background color of each defect information group layer, the analysis result display unit 205 sets a corresponding one of the image visible transmittances calculated for each of the defect information groups included in the defect information group layers.

In step S1213, the analysis result display unit 205 displays the one or more defect information group layers generated in step S1212 so as to be superimposed on the analysis image layer such that layers with higher priority are arranged in higher positions. The processing for displaying defect information group layers in a superimposed state will be described later with reference to FIG. 14 and FIGS. 15A to 15G. The priority of a layer is determined using the index used when pieces of defect information have been grouped as an evaluation value. For example, if the area to be occupied by pieces of defect information included in a layer, when displayed, is used as the grouping index, the priority is set higher for layers including pieces of defect information occupying a greater area, when displayed. Besides this, if the grouping is performed based on crack width, the priority is set higher for layers including wider cracks. Note that these indices for determining priority are mere examples, and there is no limitation to such indices.

Next, the defect information layer highlighting setting method will be described with reference to FIGS. 13A and 13B. Note that, while an example in which setting is performed using a GUI will be described in the following, there is no limitation to this. For example, a file obtained by including description of setting information in a text file may be used.

FIG. 13A illustrates an example of a defect information layer highlighting setting dialog 1300. The defect information layer highlighting setting dialog 1300 includes a defect information highlighting setting check box 1310, a defect information layer display setting check box 1320, a cancel button 1330, and an OK button 1340. If a check is entered in the defect information highlighting setting check box 1310, the highlighting setting is enabled. In contrast, if a check is not entered in the defect information highlighting setting check box 1310, the highlighting setting is disabled. Setting of the defect information layer display setting check box 1320 is performed to display layers which have been grouped for each of the defect information. If a check is entered in the defect information layer display setting check box 1320, the layer display setting is enabled. In contrast, if a check is not entered in the defect information layer display setting check box 1320, the layer display setting is disabled. The cancel button 1330 is used to cancel processing without confirming any settings changed in the defect information layer highlighting setting dialog 1300. When the cancel button 1330 is operated, the defect information layer highlighting setting dialog 1300 is closed without confirming any changes even if settings in the defect information layer highlighting setting dialog 1300 have been changed. The OK button 1340 is used to confirm settings changed in the defect information layer highlighting setting dialog 1300. When the OK button 1340 is operated, the settings after the change are confirmed if settings in the defect information layer highlighting setting dialog 1300 have been changed, and the defect information layer highlighting setting dialog 1300 is closed. Note that, if a check is not entered in the defect information highlighting setting check box 1310, i.e., if the highlighting setting is disabled, the layer display setting cannot be set. In the GUI, the defect information layer display setting check box 1320 is disabled as illustrated in FIG. 13B, for example.

Next, an example in which defect information group layers are displayed so as to be superimposed on the analysis image will be described with reference to FIG. 14 and FIGS. 15A to 15G.

Figure 15A:
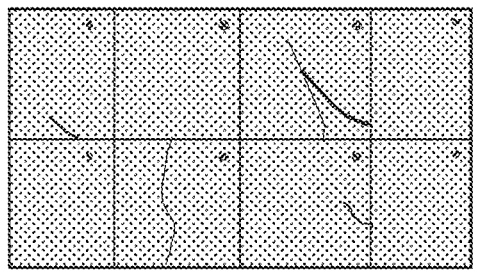
FIGS. 15A to 15G are diagrams illustrating an example of display of the result of image analysis according to the second embodiment.
Figure 15B:
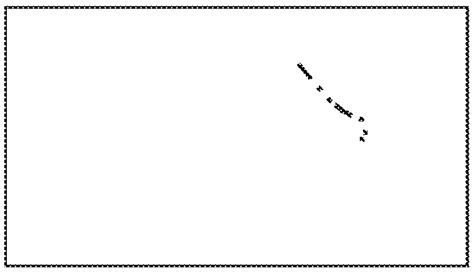
Figure 15C:
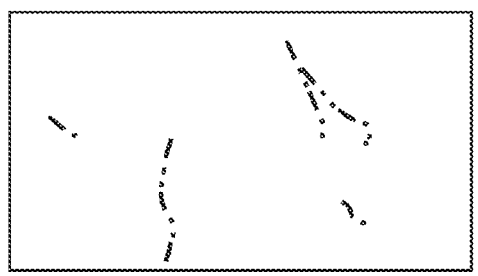
Figure 15D:
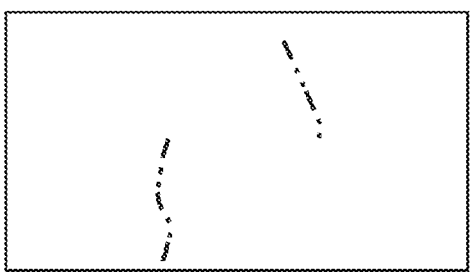

FIG. 14 illustrates an example of a defect information layer list 1400. In the example in FIG. 14, the defect information layer list 1400 includes four layers, and a defect information layer one, a defect information layer two, a defect information layer three, and an analysis image layer N are respectively arranged in records 1410, 1420, 1430, and 1440. Each of the defect information layer one, the defect information layer two, and the defect information layer three includes a crack as the type of pieces of defect information, and the defect information layer one, the defect information layer two, and the defect information layer three are layers including pieces of defect information grouped based on crack width. Furthermore, a layer including wider cracks is set as a layer having a higher priority. FIG. 15A illustrates an example of the analysis image layer. FIG. 15B illustrates an example of the defect information layer one. FIG. 15C illustrates an example of the defect information layer two. FIG. 15D illustrates an example of the defect information layer three.

Figure 15E:
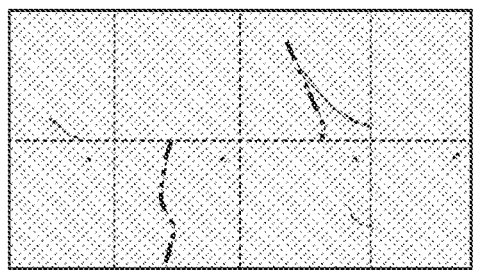
Figure 15F:
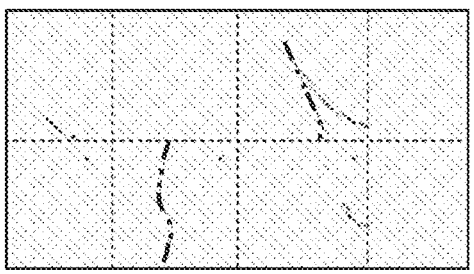

FIG. 15E illustrates an example in which the defect information layer 3 having the lowest priority among the defect information layers is displayed so as to be superimposed on the analysis image layer. The image visible transmittance calculated from the defect information group included in the defect information layer three is eighty percent according to record 1430 of the defect information layer list 1400 illustrated in FIG. 14. Thus, the analysis image in FIG. 15E is displayed with eighty percent image visible transmittance. FIG. 15F illustrates an example of a state in which the defect information layer 2 having the next lowest priority after the defect information layer 3 is displayed so as to be superimposed on the analysis image in FIG. 15E. The image visible transmittance calculated from the defect information group included in the defect information layer 2 is sixty percent according to record 1420 of the defect information layer list 1400 illustrated in FIG. 14. Thus, the analysis image in FIG. 15F is displayed in a state in which the analysis image is affected by the eighty percent image visible transmittance of the defect information layer three and the sixty percent image visible transmittance of the defect information layer 2. Specifically, the analysis image is displayed with forty-eight percent image visible transmittance, which is obtained by multiplying the sixty percent image visible transmittance and the eighty percent image visible transmittance. Furthermore, the pieces of defect information included in the defect information layer 3 are also affected by the defect information layer two and displayed with sixty percent image visible transmittance. Due to this, not only the analysis image constituting the background but also pieces of defect information having low priority are displayed in a filtered state. Thus, pieces of defect information having high priority can be discovered quickly.

Figure 15G:
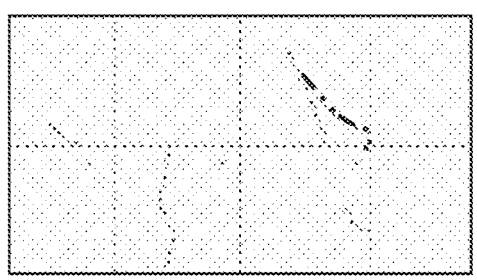

FIG. 15G illustrates an example of a state in which the defect information layer 1 having the next lowest priority after the defect information layer 2 is displayed so as to be superimposed on the state displayed in FIG. 15F. The analysis image in FIG. 15G is displayed in a state in which the analysis image is affected by the eighty percent image visible transmittance of the defect information layer 3, the sixty percent image visible transmittance of the defect information layer 2, and the eighty percent image visible transmittance of the defect information layer one. Specifically, the analysis image is displayed with thirty-eight percent image visible transmittance, which is obtained by multiplying the eighty percent image visible transmittance, the sixty percent image visible transmittance, and the eighty percent image visible transmittance. Furthermore, as is the case in FIG. 15F, pieces of defect information included in defect information layers are also affected by defect information layers displayed so as to be superimposed thereon. Specifically, the pieces of defect information included in the defect information layer three are displayed with forty-eight percent image visible transmittance, and the pieces of defect information included in the defect information layer 2 are displayed with eighty percent image visible transmittance. Because there are no layers displayed so as to be superimposed on the piece of defect information included in the defect information layer one, the piece of defect information included in the defect information layer one is not particularly affected and is displayed with 100% image visible transmittance, or in other words, in an unfiltered state.

According to the second embodiment, the visibility of pieces of defect information can be relatively improved by setting the image visible transmittance of an analysis image constituting the background so as to be lower than 100%, and, in addition, pieces of defect information of higher importance can be displayed so as to be relatively highlighted, as described above. Thus, the possibility of defect information being overlooked by experts and the possibility of inspection of a structure being carried out insufficiently can be reduced.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a processor; and
   a memory, including instructions stored thereon, which, when executed by the processor cause the image processing apparatus:
   to acquire a captured image of an inspection target;
   to detect one or more pieces of defect information based on the image;
   to determine a predetermined transmittance of the image based on a trend in the pieces of the defect information;
   to determine whether or not a first setting for displaying the pieces of defect information in a highlighted state is enabled;
   to generate a first layer including the image if the first setting is enabled, to generate a second layer to which a predetermined transmittance is set and, if the first setting is disabled, to generate a third layer including the pieces of defect information without generating the second layer; and
   to display the first, second, and third layers so as to be superimposed on one another or to display the first and third layers so as to be superimposed on one another, respectively.

2. The image processing apparatus according to claim 1, wherein the instructions, when executed by the processor, further cause the apparatus:
   to enable or to disable the first setting;
   to set the transmittance of the image; and
   to set the predetermined transmittance of the second layer to the set transmittance.

3. An image processing apparatus comprising:
   a processor; and
   a memory, including instructions stored thereon, which, when executed by the processor cause the image processing apparatus:
   to acquire a captured image of an inspection target;
   to detect one or more pieces of defect information based on the image;
   to determine a predetermined transmittance of the image, based on a trend in the pieces of the defect information, which is a ratio of the area of the pieces of defect information to the area of the image;
   to set the predetermined transmittance to an upper limit if the ratio is greater than or equal to a first threshold;
   to set the predetermined transmittance between the upper limit and a lower limit if the ratio is greater than or equal to a second threshold or a third threshold, the second and third thresholds being less than the first threshold;
   to set the predetermined transmittance to the lower limit if the ratio is less than the third threshold; and
   to display the pieces of detected defect information so as to be superimposed on the image displayed with the predetermined transmittance.

4. The image processing apparatus according to claim 3, wherein the instructions, when executed by the processor, further cause the apparatus:
   to set the upper and lower limits of the predetermined transmittance, and the first, second, and third thresholds.

5. An image processing apparatus comprising:
a processor; and
a memory, including instructions stored thereon, which, when executed by the processor cause the image processing apparatus:
  to acquire a captured image of an inspection target;
  to detect one or more pieces of defect information based on the image;
  to determine a predetermined transmittance of the image, based on a trend in the pieces of the defect information;
  to group the pieces of detected defect information into one or more groups in accordance with characteristics of the pieces of defect information, and to determine a transmittance of each group of the pieces of defect information;
  to determine whether or not a first setting for displaying the pieces of defect information in a highlighted state is enabled;
  to generate a first layer including the image if the first setting is enabled, and, if a second setting for displaying a layer for each group of the pieces of defect information is enabled, a second layer to which a transmittance is set for each group of the pieces of defect information, and, if the first setting is enabled and the second setting is disabled, or if the first setting is disabled, a third layer that includes all pieces of defect information and to which a predetermined transmittance is set; and
  to display the first and second layers so as to be superimposed on one another or to display the first and third layers so as to be superimposed on one another, respectively.

6. The image processing apparatus according to claim 5, wherein the instructions, when executed by the processor, further cause the apparatus:
  to enable or to disable the first setting; and
  to enable or to disable the second setting.

7. The image processing apparatus according to claim 5, wherein the instructions, when executed by the processor, further cause the apparatus to set the transmittance of the second layer for each group of the pieces of defect information, based on a trend in the group of the pieces of defect information.

8. The image processing apparatus according to claim 7, wherein the trend in the group of the pieces of defect information is a ratio of the area of the group of the pieces of defect information to the area of the image, and
  the instructions, when executed by the processor, further cause the apparatus:
    to set the transmittance of the second layer to an upper limit, if the ratio is greater than or equal to a first threshold;
    to set the transmittance of the second layer between the upper limit and a lower limit, if the ratio is greater than or equal to a second threshold that is less than the first threshold; and
    to set the transmittance of the second layer to the lower limit, if the ratio is less than the second threshold.

9. The image processing apparatus according to claim 8, wherein the instructions, when executed by the processor, further cause the apparatus to set the upper and lower limits of the transmittance of the second layer, and the first and second thresholds.

10. The image processing apparatus according to claim 5, wherein the predetermined transmittance of the third layer is determined based on a ratio of the area of all pieces of defect information to the area of the image.

11. The image processing apparatus according to claim 5, wherein the instructions, when executed by the processor, further cause the apparatus to determine a priority of a layer of each group of the pieces of defect information, based on characteristics of the pieces of defect information, and to perform control such that a layer having a higher priority is arranged in a higher position.

12. An image processing method comprising:
  acquiring a captured image of an inspection target;
  detecting one or more pieces of defect information based on the image;
  determining a predetermined transmittance of the image based on a trend in the pieces of the defect information;
  determining whether or not a first setting for displaying the pieces of defect information in a highlighted state is enabled;
  generating a first layer including the image if the first setting is enabled, generating a second layer to which a predetermined transmittance is set, and, if the first setting is disabled, generating a third layer including the pieces of defect information without generating the second layer; and
  displaying the first, second, and third layers so as to be superimposed on one another or displaying the first and third layers so as to be superimposed on one another, respectively.

13. A non-transitory computer-readable storage medium storing a program that causes a computer to execute an image processing method, the image process method comprising:
  acquiring a captured image of an inspection target;
  detecting one or more pieces of defect information based on the image;
  determining a predetermined transmittance of the image based on a trend in the pieces of the defect information;
  determining whether or not a first setting for displaying the pieces of defect information in a highlighted state is enabled;
  generating a first layer including the image if the first setting is enabled, generating a second layer to which a predetermined transmittance is set, and, if the first setting is disabled, generating a third layer including the pieces of defect information without generating the second layer; and
  displaying the first, second, and third layers so as to be superimposed on one another or displaying the first and third layers so as to be superimposed on one another, respectively.

14. An image processing method comprising:
  acquiring a captured image of an inspection target;
  detecting one or more pieces of defect information based on the image;
  determining a predetermined transmittance of the image, based on a trend in the pieces of the defect information, which is a ratio of the area of the pieces of defect information to the area of the image;
  setting the predetermined transmittance to an upper limit if the ratio is greater than or equal to a first threshold;
  setting the predetermined transmittance between the upper limit and a lower limit if the ratio is greater than or equal to a second threshold or a third threshold, the second and third thresholds being less than the first threshold;
  setting the predetermined transmittance to the lower limit if the ratio is less than the third threshold; and displaying the pieces of detected defect information so as to be superimposed on the image displayed with the predetermined transmittance.

15. A non-transitory computer-readable storage medium storing a program that causes a computer to execute an image processing method, the image process method comprising:
   acquiring a captured image of an inspection target;
   detecting one or more pieces of defect information based on the image;
   determining a predetermined transmittance of the image, based on a trend in the pieces of the defect information, which is a ratio of the area of the pieces of defect information to the area of the image;
   setting the predetermined transmittance to an upper limit if the ratio is greater than or equal to a first threshold;
   setting the predetermined transmittance between the upper limit and a lower limit if the ratio is greater than or equal to a second threshold or a third threshold, the second and third thresholds being less than the first threshold;
   setting the predetermined transmittance to the lower limit if the ratio is less than the third threshold; and
   displaying the pieces of detected defect information so as to be superimposed on the image displayed with the predetermined transmittance.

16. An image processing method comprising:
   acquiring a captured image of an inspection target;
   detecting one or more pieces of defect information based on the image;
   determining a predetermined transmittance of the image, based on a trend in the pieces of the defect information;
   grouping the pieces of detected defect information into one or more groups in accordance with characteristics of the pieces of defect information, and determining a transmittance of each group of the pieces of defect information;
   determining whether or not a first setting for displaying the pieces of defect information in a highlighted state is enabled;
   generating a first layer including the image if the first setting is enabled, and, if a second setting for displaying a layer for each group of the pieces of defect information is enabled, a second layer to which a transmittance is set for each group of the pieces of defect information, and, if the first setting is enabled and the second setting is disabled, or if the first setting is disabled, a third layer that includes all pieces of defect information and to which a predetermined transmittance is set; and
   displaying the first and second layers so as to be superimposed on one another or to display the first and third layers so as to be superimposed on one another, respectively.

17. A non-transitory computer-readable storage medium storing a program that causes a computer to execute an image processing method, the image process method comprising:
   acquiring a captured image of an inspection target;
   detecting one or more pieces of defect information based on the image;
   determining a predetermined transmittance of the image, based on a trend in the pieces of the defect information;
   grouping the pieces of detected defect information into one or more groups in accordance with characteristics of the pieces of defect information, and determining a transmittance of each group of the pieces of defect information;
   determining whether or not a first setting for displaying the pieces of defect information in a highlighted state is enabled;
   generating a first layer including the image if the first setting is enabled, and, if a second setting for displaying a layer for each group of the pieces of defect information is enabled, a second layer to which a transmittance is set for each group of the pieces of defect information, and, if the first setting is enabled and the second setting is disabled, or if the first setting is disabled, a third layer that includes all pieces of defect information and to which a predetermined transmittance is set; and
   displaying the first and second layers so as to be superimposed on one another or to display the first and third layers so as to be superimposed on one another, respectively.

* * * * *